US011137122B2

(12) United States Patent
Wang

(10) Patent No.: US 11,137,122 B2
(45) Date of Patent: Oct. 5, 2021

(54) VEHICLE-MOUNTED ILLUMINATION DEVICE

(71) Applicant: Yuhua Wang, Beijing (CN)

(72) Inventor: Yuhua Wang, Beijing (CN)

( * ) Notice: Subject to any disclaimer, the term of this patent is extended or adjusted under 35 U.S.C. 154(b) by 0 days.

(21) Appl. No.: 16/329,760

(22) PCT Filed: Sep. 19, 2017

(86) PCT No.: PCT/CN2017/102254
§ 371 (c)(1),
(2) Date: Feb. 28, 2019

(87) PCT Pub. No.: WO2018/059274
PCT Pub. Date: Apr. 5, 2018

(65) Prior Publication Data
US 2019/0219239 A1 Jul. 18, 2019

(30) Foreign Application Priority Data
Sep. 27, 2016 (CN) .......................... 201621080352.3

(51) Int. Cl.
*F21S 41/141* (2018.01)
*B60Q 1/24* (2006.01)
(Continued)

(52) U.S. Cl.
CPC .............. *F21S 41/141* (2018.01); *B60Q 1/02* (2013.01); *B60Q 1/24* (2013.01); *B60Q 1/26* (2013.01);
(Continued)

(58) Field of Classification Search
CPC ........ F21S 41/141; F21S 41/125; B60Q 1/02; B60Q 1/24; B60Q 1/26; B60Q 2400/20; H05B 45/20; H04L 63/083
See application file for complete search history.

(56) References Cited

U.S. PATENT DOCUMENTS 5,900,823 A * 5/1999 Coll-Cuchi ............. B60R 25/04
307/10.3
6,570,746 B1 * 5/2003 Smith ................... H02J 7/0036
320/127
(Continued)

FOREIGN PATENT DOCUMENTS

CN 2737101 Y 10/2005
CN 204104008 U 1/2015
(Continued)

OTHER PUBLICATIONS

U.S. Appl. No. 15/096,549, filed Apr. 12, 2016 (Year: 2016).*
WIPO, International Search Report dated Nov. 29, 2017 and the English Translation of the Written Opinion.

*Primary Examiner* — Amy Cohen Johnson
*Assistant Examiner* — Syed M Kaiser
(74) *Attorney, Agent, or Firm* — Li & Cai Intellectual Property (USA) Office

(57) ABSTRACT

A vehicle-mounted illumination device comprising: one or more lamps that are mounted on a vehicle and illuminate with an LED, and a controller that is mounted on the vehicle; the device is powered by a storage battery within an engine compartment of the vehicle, and is controlled to emit light by a mobile phone having a Bluetooth and installed with an APP software; the controller includes a main control module, a Bluetooth module, a drive module and a battery protection module; and the lamp emits light in the following modes: white light, color light, and white light mixed with color light; the emitted light may be stroboscopic, the brightness of the emitted light may be adjusted, a color of the emitted color light may be adjusted, and the controller may be protected by a password.

7 Claims, 2 Drawing Sheets

(51) Int. Cl.
*H05B 45/20* (2020.01)
*F21S 41/125* (2018.01)
*H04L 29/06* (2006.01)
*B60Q 1/02* (2006.01)
*B60Q 1/26* (2006.01)

(52) U.S. Cl.
CPC .......... *F21S 41/125* (2018.01); *H04L 63/083* (2013.01); *H05B 45/20* (2020.01); *B60Q 2400/20* (2013.01)

(56) References Cited

U.S. PATENT DOCUMENTS

| | | | | |
|---|---|---|---|---|
| 6,789,930 | B2* | 9/2004 | Pederson | B60Q 1/2611 |
| | | | | 362/545 |
| 6,897,624 | B2* | 5/2005 | Lys | H05B 47/175 |
| | | | | 315/297 |
| 7,458,698 | B2* | 12/2008 | Heathcock | F21S 10/005 |
| | | | | 362/101 |
| 7,468,677 | B2* | 12/2008 | Pederson | F21V 29/763 |
| | | | | 340/815.45 |
| 8,080,819 | B2* | 12/2011 | Mueller | F21S 45/42 |
| | | | | 257/13 |
| 8,297,775 | B2* | 10/2012 | Wright | F21L 4/027 |
| | | | | 362/103 |
| 8,368,346 | B2* | 2/2013 | Batson | H02J 7/0045 |
| | | | | 320/103 |
| 8,901,850 | B2* | 12/2014 | Maxik | H05B 47/19 |
| | | | | 315/297 |
| 9,862,307 | B2* | 1/2018 | Parvaresh | B60Q 1/2615 |
| 2002/0003571 | A1* | 1/2002 | Schofield | B60C 23/00 |
| | | | | 348/148 |
| 2006/0038499 | A1 | 2/2006 | Yeh | |
| 2008/0266446 | A1 | 10/2008 | Ma | |
| 2008/0310850 | A1* | 12/2008 | Pederson | G08B 13/19671 |
| | | | | 398/135 |
| 2009/0096994 | A1* | 4/2009 | Smits | G01B 11/14 |
| | | | | 353/30 |
| 2011/0062888 | A1* | 3/2011 | Bondy | H05B 45/10 |
| | | | | 315/294 |
| 2011/0121654 | A1* | 5/2011 | Recker | H05B 47/19 |
| | | | | 307/66 |
| 2012/0140080 | A1* | 6/2012 | Taylor | B60C 23/0408 |
| | | | | 348/148 |
| 2013/0141579 | A1* | 6/2013 | Schofield | B60Q 1/2661 |
| | | | | 348/148 |
| 2013/0271016 | A1* | 10/2013 | Shuy | H05B 45/00 |
| | | | | 315/159 |
| 2013/0334980 | A1* | 12/2013 | Zhou | H05B 45/10 |
| | | | | 315/250 |
| 2014/0111139 | A1* | 4/2014 | Chen | B60L 11/1809 |
| | | | | 320/107 |
| 2014/0293595 | A1* | 10/2014 | May | F21S 4/28 |
| | | | | 362/218 |
| 2014/0309864 | A1* | 10/2014 | Ricci | H04W 4/21 |
| | | | | 701/36 |
| 2015/0061387 | A1* | 3/2015 | Daniel | H02J 3/28 |
| | | | | 307/24 |
| 2015/0214736 | A1* | 7/2015 | Kung | H05B 45/46 |
| | | | | 307/23 |
| 2015/0248795 | A1* | 9/2015 | Davidson | G01C 21/34 |
| | | | | 701/1 |
| 2015/0283939 | A1* | 10/2015 | Parkes | B60Q 1/503 |
| | | | | 340/468 |
| 2015/0302738 | A1* | 10/2015 | Geerlings | G08C 17/02 |
| | | | | 340/5.25 |
| 2016/0028257 | A1* | 1/2016 | Hashimoto | H02J 7/0047 |
| | | | | 320/112 |
| 2016/0214535 | A1* | 7/2016 | Penilla | B60L 53/65 |
| 2016/0323972 | A1* | 11/2016 | Bora | F21V 23/06 |
| 2017/0142800 | A1* | 5/2017 | Schultheis | B60Q 1/28 |
| 2017/0246985 | A1* | 8/2017 | Dellock | B60Q 1/2696 |
| 2017/0302090 | A1* | 10/2017 | Han | H01M 10/42 |
| 2017/0354019 | A1* | 12/2017 | Julian | B60Q 1/444 |
| 2019/0058351 | A1* | 2/2019 | Chang | G09G 3/344 |
| 2019/0222725 | A1 | 7/2019 | Wang | |

FOREIGN PATENT DOCUMENTS

| | | |
|---|---|---|
| CN | 204272250 U | 4/2015 |
| CN | 204887169 U | 12/2015 |
| CN | 206077548 U | 4/2017 |

* cited by examiner

VEHICLE-MOUNTED ILLUMINATION DEVICE

CROSS-REFERENCE TO RELATED APPLICATION

This application is a national stage of International Application No. PCT/CN2017/102254 filed on Sep. 19, 2017, which claims priority to Chinese Utility Model Application No. 201621080352.3, filed on Sep. 27, 2016 and titled "VEHICLE-MOUNTED ILLUMINATION DEVICE", the entirety of all which are incorporated herein by reference.

TECHNICAL FIELD

The present disclosure relates to an LED (light emitting diode) illumination device, and particularly relates to an additional illumination device mounted on a vehicle.

BACKGROUND

For vehicles, especially for off-road vehicles, it is often necessary to mount an additional illumination device for auxiliary illumination, special illumination or interest illumination in the field. However, at present there is no such a technical solution providing an LED illumination device that is controlled by a smart phone in various modes.

SUMMARY

An object of the disclosure is to provide a vehicle-mounted illumination device comprising: one or more lamps that are mounted on a vehicle and illuminate with an LED, and a controller that is mounted on the vehicle. The device is powered by a storage battery within an engine compartment of the vehicle, and is controlled to emit light by a mobile phone (i.e., smart phone) having a Bluetooth and installed with an APP software.

The lamp is mounted outside the vehicle, and the controller is provided in the engine compartment of the vehicle.

The controller includes a main control module, a Bluetooth module, a drive module and a battery protection module.

One or more white LED lights and one or more color LED lights are disposed in the lamp.

Two white LED lights and two color LED lights are disposed in the lamp.

Light emission is controlled by the mobile phone in the following manner: a main control module of the controller receives control information from a mobile phone APP through the Bluetooth module, decodes the information and transmits a decoded information to the drive module, the drive module receives a command from the main control module, and outputs power respectively required by the white LED lights and the color LED lights within the lamp to the white LED lights and the color LED lights through a conductive wire in a cable according to respective electrical parameters of the white LED lights and the color LED lights, such that the two types of lights emit light according to a pattern of the command.

The mobile phone controls the lamp to emit light in the following modes:

an illumination mode, in which both the white LED lights and the color LED lights emit white light;

a color light mode, in which the white LED lights do not emit light but the color LED lights emit color light only;

a mixed illumination and color light mode, in which the white LED lights emit white light while the color LED lights emit color light;

a stroboscopic mode, in which all the above illumination mode, color light mode, and mixed illumination and color light mode are controlled to emit light in a stroboscopic mode, and the frequency of the strobe can be adjusted;

An intensity of brightness of the light in all the illumination mode, color light mode, mixed illumination and color light mode, and stroboscopic mode may be controlled;

A color of the color light emitted in the color light mode and the mixed illumination and color light mode may be adjusted by adjusting an intensity of a red (R), blue (B) and green (G) light.

The battery protection module performs its function in the following manner: a generator of the vehicle stops charging the storage battery after an engine of the vehicle is turned off. At this time, if the lamp is not turned off for a long period of time, power in the storage battery would be consumed up, then it would be impossible for the vehicle to be started next time. Thus, when the battery protection module detects that a voltage of the storage battery is lower than a set first low value, the controller turns off an output of the storage battery to enter into a standby state, so as to protect the storage battery.

A first low value of the voltage is 12.2 V (DC).

The function of the battery protection module is: when the battery protection module detects that the voltage of the storage battery is lower than the set first low value for 30 minutes, the controller turns off the output of the storage battery to enter into the standby state, so as to protect the storage battery.

The function of the battery protection module is: when the battery protection module detects that the voltage of the storage battery is lower than the set first low value for 30 minutes, the controller turns off the output of the storage battery to enter into the standby state, so as to protect the storage battery. In the mean time, during the 30 minutes, when it is detected that the storage battery voltage is lower than a set second low value for 10 seconds, the controller turns off the output of the storage battery in advance to protect the storage battery.

A second low value of the voltage is 11.7 V (DC).

In order to prevent others from using a mobile phone Bluetooth to connect to the controller and controlling the LED lights without permission, a password may be set for the controller to protect our device.

The present disclosure provides a technical solution according to which an LED illumination device is controlled by a smart phone in various modes, which has advantages of simple structure and convenient use.

DETAILED DESCRIPTION

Figure 1:
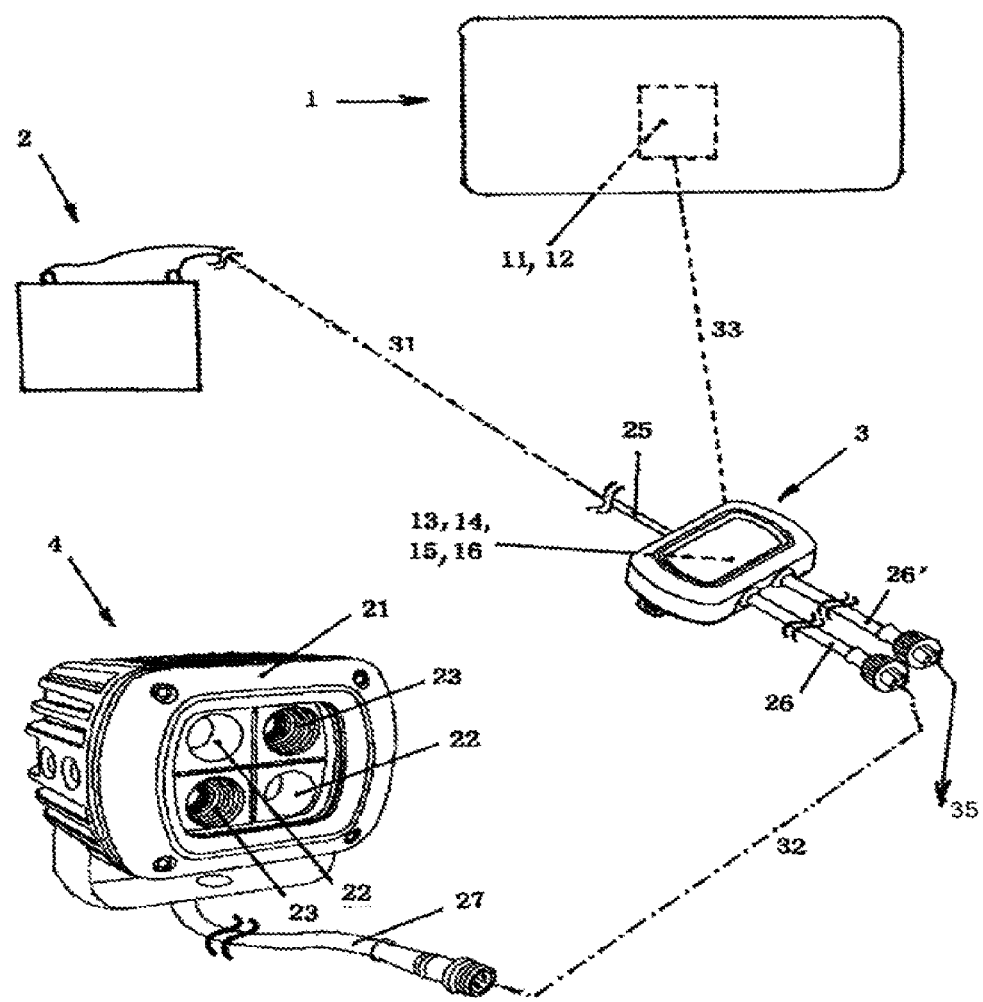
FIG. 1 is a view showing a vehicle-mounted illumination device system according to a basic embodiment of the disclosure.

FIG. 1 is a view showing a vehicle-mounted illumination device system according to a basic embodiment of the disclosure. The system includes a mobile phone 1 (i.e., a smart phone) that has a Bluetooth module 11 and is installed with an APP software 12; and the system further includes an automotive storage battery 2, a controller 3 mounted on the vehicle, and a lamp 4 that is mounted on the vehicle and emits light with an LED.

The controller 3 is provided with a main control module 13, a Bluetooth module 14, a drive module 15, and a battery protection module 16. An external conductor cable of the controller 3 includes: a cable 25 for receiving power from the storage battery 2, which is connected to the storage battery 2 as shown by a dashed line 31 in the figure; and an output cable 26 and 26' connected to the lamp, wherein the number of the output cables may vary from design to design.

The lamp 4 has a casing 21 in which one or more white LED lights 22 and one or more color LED lights 23 are disposed (in the embodiment shown in this figure, there are two white LED lights 22 and two color LED lights 23). In the figure, connection between the output cable 26 of the controller 3 and an input cable 27 of the lamp 4 is represented by a dashed line 32. Another output cable 26' of the controller 3 may be connected to other lamps as shown by an arrow 35 in the figure.

The dotted line 33 in the figure represents wireless connection of the Bluetooth module 11 of the mobile phone 1 with the Bluetooth module 14 of the controller 3.

Figure 2:
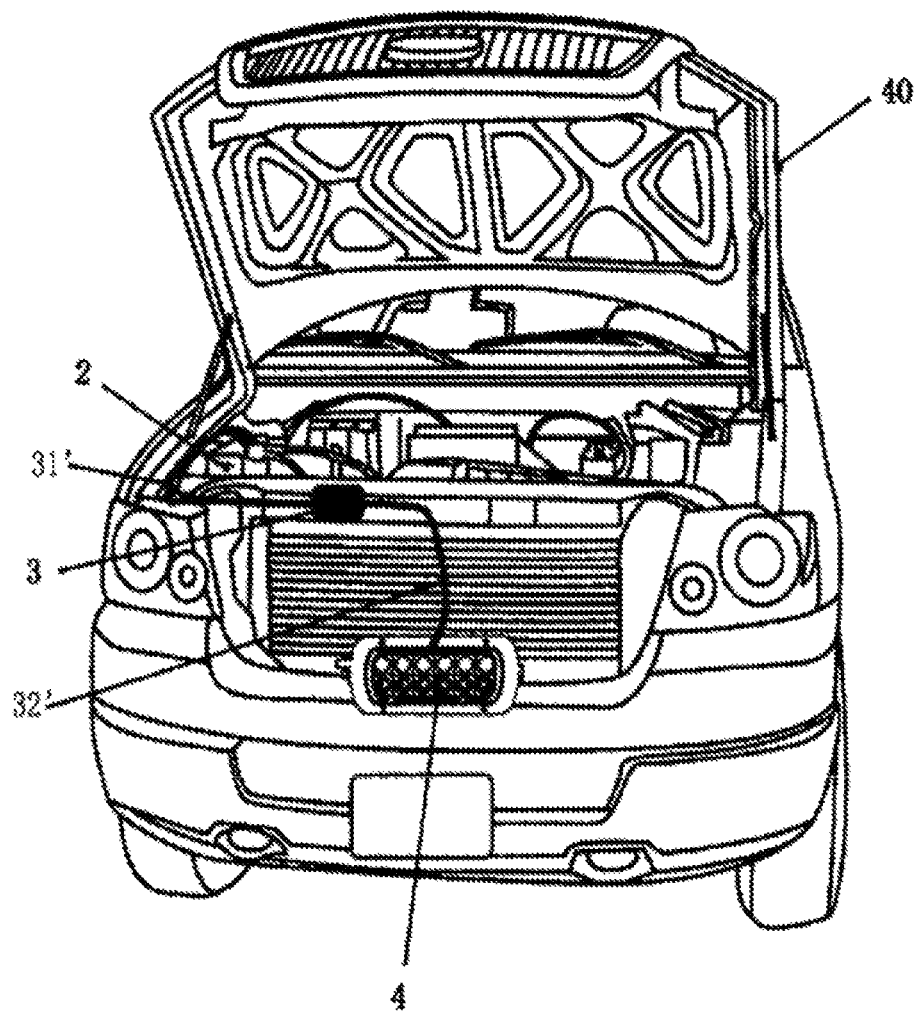
FIG. 2 is a schematic view showing an example of installation of the vehicle-mounted illumination device system according to the disclosure on a vehicle.

FIG. 2 shows an example of installation of the vehicle-mounted illumination device system according to the disclosure on a vehicle. The numeral signs 31' and 32' in the figure represent connected conductor cables respectively, and the numeral sign 40 represents an engine compartment cover (which is open in the figure). Other numeral signs in the figure have the meanings as stated above.

Light emission is controlled by the mobile phone 1 in the following manner: the main control module 13 of the controller 3 receives control information from an APP of the mobile phone 1 through the Bluetooth module 14, decodes the information, and transmits a decoded information to the drive module 15, the drive module 15 receives a command (the decoded information) from the main control module 13, and outputs power respectively required by the white LED lights 22 and the color LED lights 23 within the lamp 4 to the white LED lights 22 and the color LED lights 23 through a conductive wire in a cable according to respective electrical parameters of the white LED lights 22 and the color LED lights 23, such that the two types of lights emit light according to a pattern of the command.

Examples of the lamp 4 being controlled by the mobile phone 1 to emit light are as follows:

an illumination mode, in which both the white LED lights 22 and the color LED lights 23 emit white light;

a color light mode, in which the white LED lights 22 do not emit light but the color LED lights 23 emit color light only;

a mixed illumination and color light mode, in which the white LED lights 22 emit white light while the color LED lights 23 emit color light;

a stroboscopic mode, in which all the above illumination mode, color light mode, and mixed illumination and color light mode are controlled to emit light in a stroboscopic mode, and the frequency of the strobe can be adjusted;

wherein, an intensity of brightness in all the illumination mode, color light mode, mixed illumination and color light mode, and stroboscopic mode may be controlled;

wherein, a color of the color light emitted in the color light mode and the mixed illumination and color light mode may be adjusted by adjusting an intensity of a red (R), blue (B) and green (G) light.

Examples of function of the battery protection module 16 are as follows.

1) A generator of a vehicle stops charging the storage battery after an engine of the vehicle is turned off. At this time, if the lamp is not turned off for a long period of time, power in the storage battery would be consumed up. Then it would be impossible for the vehicle to be started next time. Thus, when the battery protection module detects that the voltage of the storage battery is lower than a set first low value, the controller turns off an output of the storage battery to enter into a standby state to protect the storage battery. For example, the first low value of the voltage may be set to be 12.2 V (DC).

2) When the battery protection module 16 detects that the voltage of the storage battery is lower than the set first low value for, for example, 30 minutes, the controller 3 turns off the output of the storage battery to enter into the standby state to protect the storage battery. For example, the first low value of the voltage may be set to be 12.2 V (DC).

3) When the battery protection module 16 detects that the voltage of the storage battery is lower than the set first low value for, for example, 30 minutes, the controller 3 turns off the output of the storage battery to enter into the standby state to protect the storage battery. In the mean time, an additional condition is that during the 30 minutes, when it is detected that the voltage of the storage battery is lower than a set second low value for, for example, 10 seconds, the controller 3 turns off the output of the storage battery in advance to protect the storage battery. For example, the first low value of the voltage may be set to be 12.2 V (DC), the second low value of the voltage may be set to be 11.7 V (DC).

In addition, in order to prevent others from using a mobile phone Bluetooth to connect to the controller 3 and controlling the LED lights without permission, a password may be set for the controller 3 to protect our device.

What is claimed is:

1. A vehicle-mounted illumination device, comprising:
   one or more lamps that are mounted on a vehicle and emit light with an LED; and
   a controller that is mounted on the vehicle, the device being powered by a storage battery within an engine compartment of the vehicle, and is controlled to emit light by a mobile phone having a Bluetooth and installed with an APP software,
   wherein the controller includes a main control means, a Bluetooth means, a drive means and a battery protection means,
   light emission is controlled by the mobile phone in the following manner: the main control means of the controller receives control information from a mobile phone APP through the Bluetooth means, decodes the information and transmits a decoded information to the drive means, the drive means receives a command from the main control means, and outputs power respectively required by the white LED lights and the color LED lights within the lamp to the white LED lights and the color LED lights through a conductive wire in a cable according to respective electrical parameters of the white LED lights and the color LED lights, such that the two types of lights emit light according to a pattern of the command,
   the mobile phone controls the lamp to emit light in the following modes:
   an illumination mode, in which both the white LED lights and the color LED lights emit white light;

a color light mode, in which the white LED lights do not emit light but the color LED lights emit color light only;

a mixed illumination and color light mode, in which the white LED lights emit white light while the color LED lights emit color light;

a stroboscopic mode, in which all the above illumination mode, color light mode, and mixed illumination and color light mode are controlled to emit light in a stroboscopic mode, and the frequency of the strobe can be adjusted;

an intensity of brightness of the light in all the illumination mode, color light mode, mixed illumination and color light mode, and stroboscopic mode may be controlled; and a color of the color light emitted in the color light mode and the mixed illumination and color light mode may be adjusted by adjusting an intensity of a red (R), blue (B) and green (G) light, the battery protection means performs its function in the following manner:

when the battery protection means detects that a voltage of the storage battery is lower than a set first low value, the controller turns off an output of the storage battery to enter into a standby state, so as to protect the storage battery, the function of the battery protection means is:

when the battery protection means detects that the voltage of the storage battery is lower than the set first low value for 30 minutes, the controller turns off the output of the storage battery to enter into the standby state, so as to protect the storage battery, and in the mean time, during the 30 minutes, when it is detected that the storage battery voltage is lower than a set second low value for 10 seconds, the controller turns off the output of the storage battery in advance to protect the storage battery.

2. The vehicle-mounted illumination device according to claim 1, wherein the lamp is mounted outside the vehicle, and the controller is provided in the engine compartment of the vehicle.

3. The vehicle-mounted illumination device according to claim 1, wherein one or more white LED lights and one or more color LED lights are disposed in the lamp.

4. The vehicle-mounted illumination device according to claim 1, wherein two white LED lights and two color LED lights are disposed in the lamp.

5. The vehicle-mounted illumination device according to claim 1, wherein a first low value of the voltage is 12.2 V (DC).

6. The vehicle-mounted illumination device according to claim 1, wherein a second low value of the voltage is 11.7 V (DC).

7. The vehicle-mounted illumination device according to claim 1, wherein in order to prevent others from using a mobile phone Bluetooth to connect to the controller and controlling the LED lights without permission, a password may be set for the controller to protect a user's device.

* * * * *